(No Model.) 4 Sheets—Sheet 1.
F. H. RICHARDS.
REGULATOR FOR GRAIN SCALES.
No. 442,711. Patented Dec. 16, 1890.
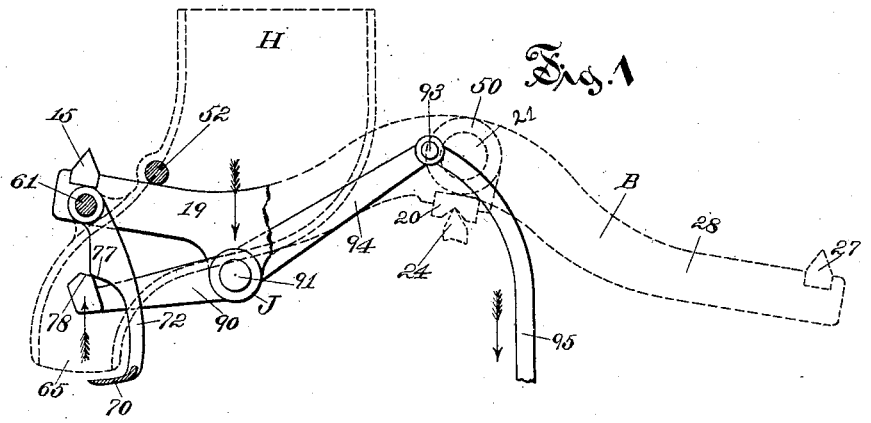
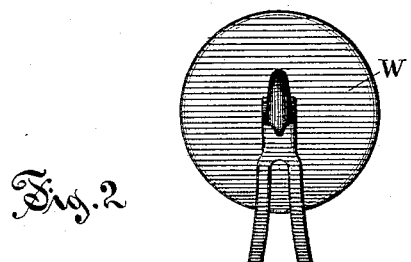
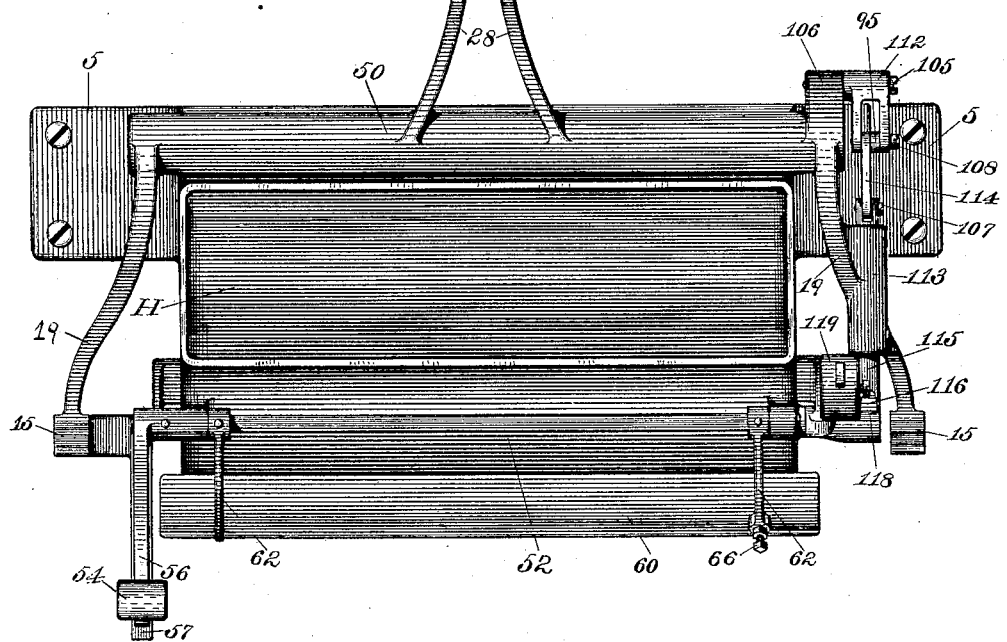
Witnesses:
W. M. Bjorkman
Henry L. Reckard
Inventor:
Francis H. Richards

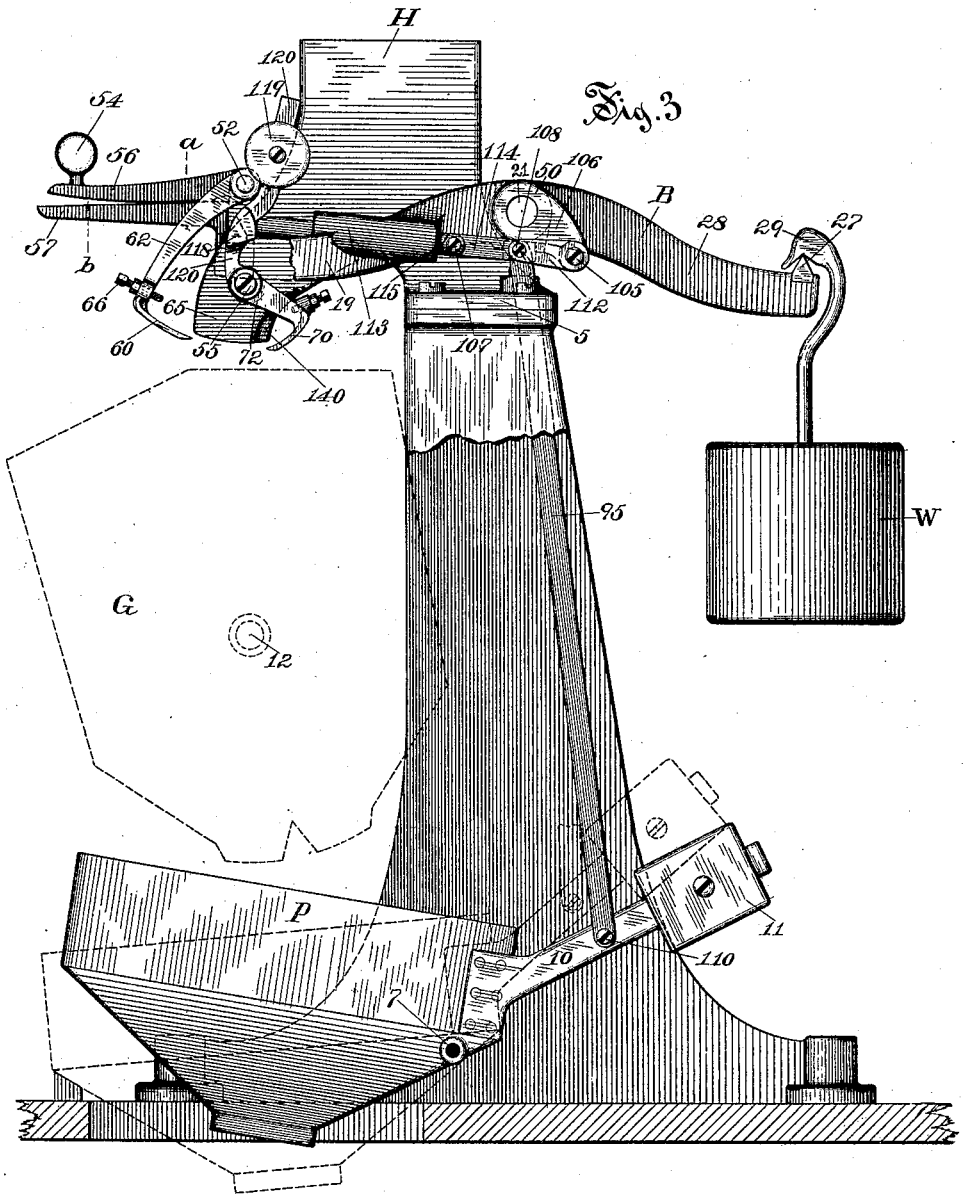

(No Model.) 4 Sheets—Sheet 3.
F. H. RICHARDS.
REGULATOR FOR GRAIN SCALES.
No. 442,711. Patented Dec. 16, 1890.
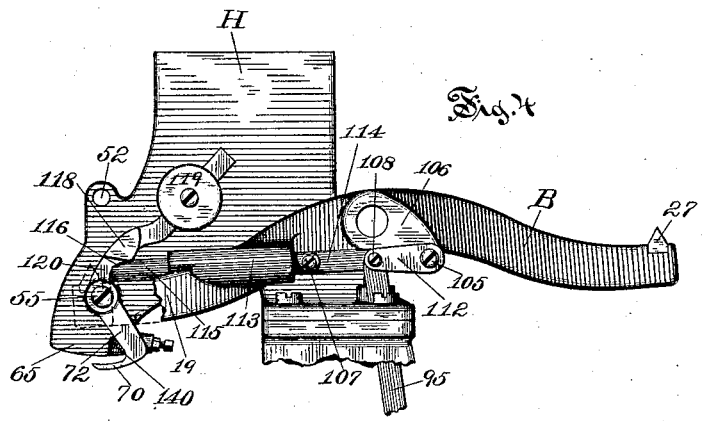
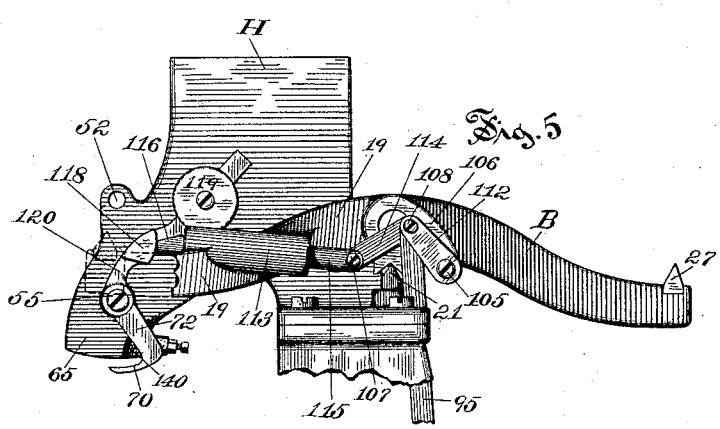
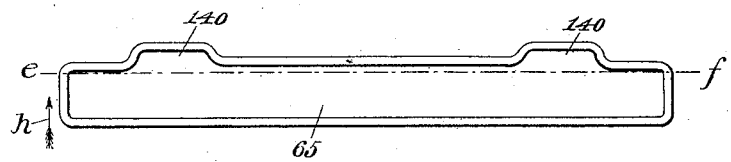
Witnesses:
W. M. Bjorkman.
Henry L. Reckard.
Inventor:
Francis H. Richards (No Model.)　　　　F. H. RICHARDS.　　　4 Sheets—Sheet 4.
REGULATOR FOR GRAIN SCALES.
No. 442,711.　　　　　　　Patented Dec. 16, 1890.
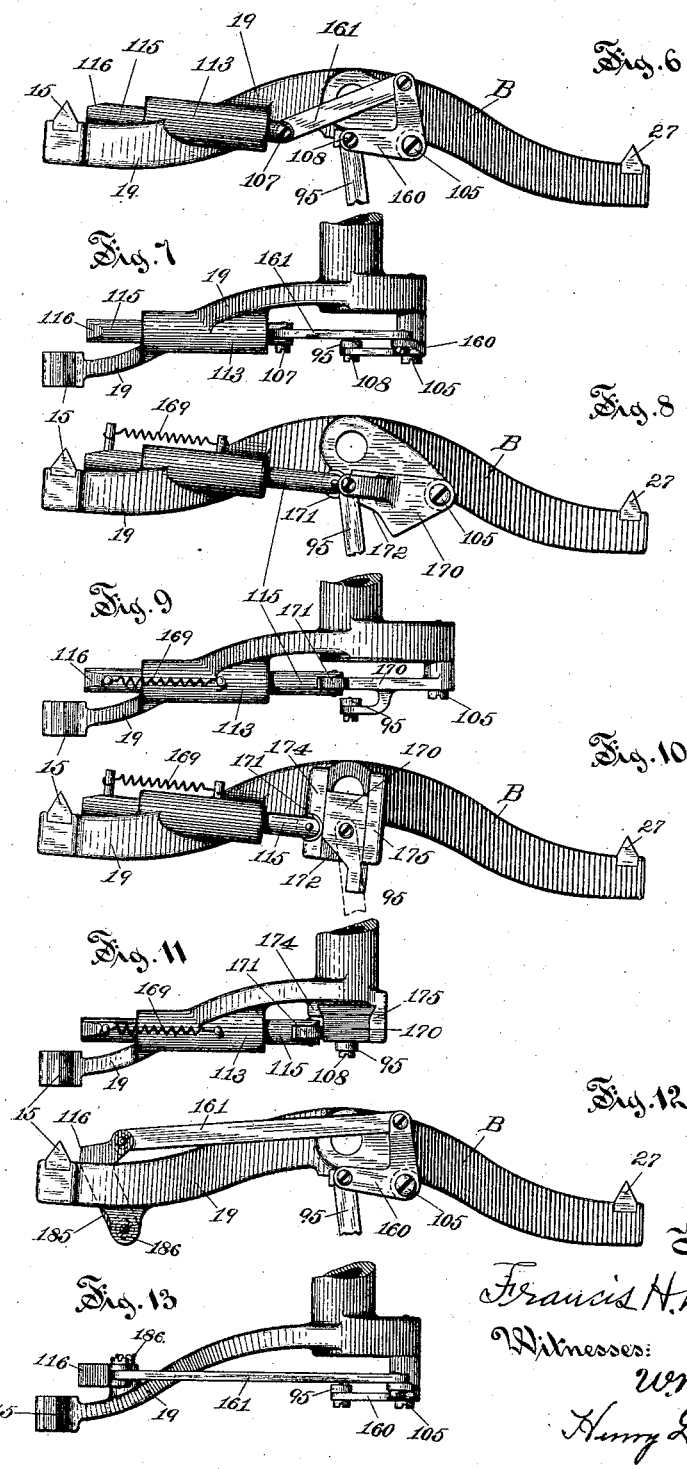

UNITED STATES PATENT OFFICE.

FRANCIS H. RICHARDS, OF HARTFORD, CONNECTICUT, ASSIGNOR TO THE PRATT & WHITNEY COMPANY, OF SAME PLACE.

REGULATOR FOR GRAIN-SCALES.

SPECIFICATION forming part of Letters Patent No. 442,711, dated December 16, 1890.

Application filed September 17, 1889. Serial No. 324,242. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Regulators for Grain-Weighers, of which the following is a specification.

This invention is in the nature of an improvement on the invention described and claimed in my application, Serial No. 341,104, filed February 20, 1890.

The invention consists in certain improvements in the combination described and broadly claimed in my application, Serial No. 340,814, filed February 17, 1890, to which reference may be had.

In the drawings accompanying and forming a part of this specification, Figure 1 is a diagrammatic view illustrating that feature or defect of my said prior invention which my present improvement is more especially designed to overcome. Fig. 2 is a plan view of so much of an automatic grain-weigher as embodies my present improvement. Fig. 3 is a side elevation of the same. Figs. 4 and 5 are two views similar to the upper portion of Fig. 3, showing the valve-actuating devices in different positions, respectively. Figs. 6 and 7 are a side and plan view, respectively, of one modification of said valve-actuating mechanism. Figs. 8 and 9 are similar views of another modification of the same mechanism, and Figs. 10 and 11 similar views of a further modification thereof. Figs. 12 and 13 are similar views, respectively, of a further modification of the form shown in Figs. 6 and 7. Fig. 14 is a plan view of the under side of the supply-chute, showing an improved construction thereof.

Similar characters designate like parts in all the figures.

It will be remembered that in the machine described in said prior application the cam for opening the cut-off valve is not fixed directly on the main beam, but is formed on or affixed to "a supplemental beam or lever that is fitted to be shifted on said main beam, whereby the cams (cam) may be thrown into an inoperative position whether or not the main beam stands in its upper or in its lower position, this shifting movement being derived from regulator devices." In Fig. 1 I have shown the said "supplemental beam or lever" 90 shifted to permit the closing of the valve 70, while the main beam B is standing in its uppermost position. If now the regulator devices shall so operate as to draw down the rod 95, then the said lever 90 will be swung on its pivot 91, (which, it should be noted, is on the main beam,) and will act upwardly on the cam 77 on the valve-arm 72 of the valve 70, and consequently will react downwardly on said pivot 91. Ordinarily and in larger-sized machines this feature is not deemed especially detrimental; but in small-sized machines the thrust thus applied to said pivot, this being necessarily so far from the axis 21 of the beam, tends to turn the beam on its axis, and thus to prematurely lower the bucket and discharge therefrom the load of grain uncompleted. The object, then, of my present improvements is to furnish a regulator apparatus in which the shifting on the main beam of the valve-actuating device shall not act on the beam in the manner above pointed out.

As in my said prior invention, so in my present invention, the valve-actuating device carried on or by the main beam is constructed to be shifted on said beam to render such device inoperative to actuate the valve. This shifting movement, according to my present improvements, is made about radial to the axis of the beam, this being adopted for the purpose of preventing the action of said device from imparting a movement, as above described, to the beam on its said axis. To this end the shifting movement of such valve-actuating device is derived or obtained by and through a shifting device which reacts against some point or part on the main beam itself usually and preferably in a direction substantially in alignment with the said shifting movement and coinciding substantially with the axis of the beam. The particular construction of this shifting device may be varied, and I have shown and described herein several analogous forms thereof, all of which, however, operate on the same principle. In the general views, Figs. 2 to 5, inclusive, the form of said device shown is a plain linkage constructed and arranged to react against the pin or stud 105, that is fixed in the arm 106 of the main beam, and to be operated by the rod 95 from the regulator-hopper P. This hopper, together with its pivots 7 and weighted arm 10, is or may be the same as the corresponding parts in my said prior application. The rod 95 being connected at 110 to the lever 10 is actuated by said lever on the rising or falling of the hopper. The upper end of said rod connects to the pin 108, fixed in the link 112. Another link 114 is connected at one end to said pin 108 and at the other end to the pin 107 in slide 115. This slide or shiftable block is shown fitted to be moved in the sleeve 113 of the arm 19 in a direction substantially radial to the axis 21 of the main beam. At its front end said block 115 is formed into a cam 116, which acts on the cam 118 of the arm 120 of the cut-off valve 70, this valve being pivoted by its arms 72 on pivots 55, that are fixed in the end walls of the supply-chute H. In practice I extend the arm 120 beyond cam 118 and fix thereon a suitable weight 119, whose purpose is to bear the cam 118 down onto the cam 116, when the latter lies below the former, as in Fig. 4, and thus impart a distinct downward thrust on the beam itself, the object of this thrust being to furnish power to send down the poised bucket G and thus uncatch the latches thereof to discharge the load therefrom. For a particular description of the said bucket and latches and of the hangers and closers therefor and minor details thereof reference may be had to the application of C. H. Cooley, Serial No. 308,474, to which I have permission to refer.

The normal operation of the main beam and cut-off valve is shown in Figs. 3 and 4. In these views the links 112 and 114 stand in about a straight line, the middle pivot 108 of the linkage being substantially coincident with the axis 21 of the beam. By virtue of this arrangement any force or resistance acting on the cam 116 does not tend materially to change the position of said links, but is transmitted directly to the pin 105, or if lateral to said block 115 is taken by sleeve 113. The linkage remaining as just described, the cam or valve actuator 116 lies under cam 118 when the beam is down, as in Fig. 4, and on the rising of said beam, as in Fig. 3, bears against cam 118, thus opening the valve 70, as there shown. This mode of operation may be properly designated as the normal operation of the valve-actuating mechanism for the cut-off valve.

To understand the operation of the mechanism for the regulation of the machine let us refer to Fig. 4, and suppose that, the beam being down, the bucket G, Fig. 3, has discharged its load into the hopper P and carried this down, as there indicated by dotted lines. This moves up rod 95 and the links 112 114 and draws back the block 115, as shown in Fig. 5, so that on the rising of the beam, cam, or valve actuator 116 clears cam 118 and thus leaves the valve 70 closed and causes the machine to come to a standstill. The grain in hopper P being sufficiently discharged, the weight 11 draws down rod 95 and acting on the said linkage forces forward the cam or valve-actuator 116 against cam 118, and thus opens the valve 70, as in Fig. 3, and thus starts the machine into operation again. The thrust of rod 95 being in a line coincident substantially with the axis 21, does not materially tend to turn the beam on said axis; but the force of said rod being transmitted through the linkage expends its power directly between the cam 118 and the pin 105 in a line also passing through the plane substantially of said axis. The result is that the action of the regulator apparatus is practically neutralized and exerts no material effect on the beam nor impairs the weighing operation.

The valve 70 is a "cut-off" for cutting off the small stream of grain or "drip," by which the load is completed. Another valve 60 is employed to reduce the main column of grain before the valve 70 begins to operate. This reducing-valve is carried by arms 62 on the shaft 52, and is operated directly from the main beam through an arm 57 thereof, acting on the reducing-cam 56, that is attached to said shaft 52. The lower face of this cam is curved, so that the point of contact thereof with said arm 57 moves out as the beam descends, thus lengthening the distance from shaft 52 to said point of contact and reducing the effect on the beam of the weight of said cam and reducing-valve. The result of this construction is to slowly carry the valve 60 under the spout 65 of the chute H and thus to gradually reduce the flow of grain into the bucket G. The object of this feature is to overcome the effect of the rapid filling of the bucket and lessen the momentum acquired by the bucket during the early part of its descent by lessening the velocity of that descent.

The main or reducing valve 60 being actuated directly from the beam, the regulator apparatus is not operative to stop the machine until the bucket has received the major part of its load and the said valve 60 has closed. This effect, however, is not objectionable, since the machine thus starts more promptly when the valve 70 is opened by the regulator.

The proper proportion between the first or major part of the load and that part of the load made up by the drip is determined by the weight on arm 57, which is regulated in practice by trial, being graduated until a suitable and smooth action of the machine is secured. For this purpose I ordinarily use a separate weight 54 on the reducing-cam 56, which weight if not correct may be replaced by others, or may be adjusted longitudinally of said cam. In practice I weight said cam 56 so as to begin shutting the valve 60 when the bucket is about or nearly four-sixths loaded, and then experimentally shape the cam 56 and adjust the weight thereon to close the valve 60 when about five-sixths of the load is in the bucket, leaving about one-sixth of the load to be completed by the drip. The said operations of shaping and adjustment should be carried on together, and are readily performed in any given instance by skillful mechanics who are familiar with the art of laying out cams in general, and are also practically acquainted with this class of automatic grain-weighing machines. It will be understood that the beam leaves the cam 56 just prior to the cam 118 passing under the cam 116, which latter operation causes the bucket to be discharged of its load.

In Fig. 14 I have shown a plan view of the lower end of the supply-chute 65 constructed with two drip-channels 140 140 on the rearward side thereof. The main valve 60 closes under said chute from the direction of arrow $h$ up to about the line $e\ f$, thus shutting off the main column of descending grain and leaving only the channels 140 to be closed by the cut-off valve 70. This latter valve, it will be noticed in Figs. 3, 4, and 5, is hung on pivots much lower than the pivot 52 of valve 60, so that the arms 72 are much shorter than arms 62. This construction gives to the weight 119 a greater travel than it otherwise would have, so that while it stands nearly above pivot 55 in Fig. 3 and exerts only a slight force against cam 116 in Fig. 4 it lies far to one side of said pivot and exerts a heavy pressure on said cam, this effect being for the purpose hereinbefore pointed out. By said construction, also, the cam 118 is above said pivot 55, so that a forward movement of cam 116 operates to open the valve 70, and vice versa, which mode of operation is obviously most favorable to the employment for actuating the cam 116 of the actuator-shifting device herein shown and described. This feature of the regulator apparatus is described and claimed in the joint application of C. H. Cooley and F. H. Richards, Serial No. 339,967, filed February 11, 1890.

As hereinbefore stated, the particular form and arrangement of the actuator-shifting device may be varied or modified.

In Figs. 6 and 7 the form of said device is that of an angle-lever 160, pivotally supported on and in proper relation to the beam, and connected at one end to said shiftable valve-actuating device or element 115 by a link 161 and at the other end to rod 95. The pivot 108, as in the previous instance, coincides substantially with the axis of the beam when the rod 95 is down, as shown in Fig. 6.

In Figs. 8 and 9 the form of said device is that of a rotary reciprocating cam 170, which bears or reacts against the pin 105 in substantial alignment with the movement of the block 115, which has in this case a roller 171 bearing on the face 172 of said cam.

In Figs. 10 and 11 a further modification is shown, wherein the cam 170 is made to slide between guides 174 175 and crosswise to the line of movement of the sliding part 115. The mode of operation, however, is in no wise materially changed. In each of the preceding cases the slide 115 may be retracted by a spring 169 in a well-known manner, or the cam may be a "closed cam" whose grooves engage a pin on the slide, in a manner too well known to require description.

In Figs. 12 and 13 the cam 116 is formed on a block 185, that is pivotally supported at 186 on the beam-arm 19, and is actuated by the devices shown in Figs. 6 and 7. In this instance the block 185 is an obvious equivalent for the slide 115 of the preceding figures.

The cut-off valve 70, having the weighted cam-arm, is of the kind described and claimed in the joint application of C. H. Cooley and F. H. Richards, Serial No. 339,967, filed February 11, 1890.

The reducing-valve 60, combined with the valve-actuating lever or cam-arm thereof and operated by an arm of the scale-beam, is described and claimed in the application of C. H. Cooley, Serial No. 338,818, filed January 31, 1890, to which I have permission to refer.

Having thus described my invention, I claim—

1. In a regulator grain-weigher, the combination of the supply-chute, the main beam, a valve arranged to close said chute, devices carried on the main beam for actuating the valve and constructed, substantially as described, to be shiftable on said beam substantially radially to the axis thereof, and means for making inoperative said devices by shifting the same on said beam in said direction, substantially as described.

2. In a regulator grain-weigher, the combination of the supply-chute, the main beam, a valve arranged to close said chute, the radially-shiftable actuator carried on said main beam, the pivot 105, fixed on said beam, and a shifting device acting between the said actuator and pivot and actuated from a regulator-hopper, all substantially as described.

3. In a regulator grain-weigher, the combination of the supply-chute, the main beam, a valve arranged to close said chute and having a cam on the arm thereof, the radially-movable actuator carried on said beam and located to actuate said valve by acting against the cam thereof, and the actuator-shifting links 112 and 114, actuated by a rod from the regulator-hopper and reacting against a point on the beam, all substantially as described.

4. In a regulator grain-weigher, the combination, with the supply-chute and the beam, of the valve 70, pivoted as set forth and having a cam on the weight-arm thereof, and a shiftable actuator on the beam, arranged to open said valve by acting on the cam thereof in a direction substantially radial to the axis of the beam, said valve-cam being constructed and arranged to bear down on the shiftable actuator when the beam descends to close said valve, all substantially as described.

FRANCIS H. RICHARDS.

Witnesses:
L. C. HEERMANN,
HENRY L. RECKARD.